US007781744B2

(12) United States Patent
Bedeschi

(10) Patent No.: US 7,781,744 B2
(45) Date of Patent: Aug. 24, 2010

(54) PROCEDURE FOR THE PREPARATION OF RADIOISOTOPES

(75) Inventor: Paolo Bedeschi, Castel Bolognese (IT)

(73) Assignee: Comecer S.p.A., Bolognese (IT)

( * ) Notice: Subject to any disclaimer, the term of this patent is extended or adjusted under 35 U.S.C. 154(b) by 187 days.

(21) Appl. No.: 12/195,855

(22) Filed: Aug. 21, 2008

(65) Prior Publication Data

US 2010/0044587 A1 Feb. 25, 2010

(51) Int. Cl.
*B01D 59/40* (2006.01)
*G21K 5/04* (2006.01)

(52) U.S. Cl. ........................... 250/432 PD; 250/423 R; 250/492.1

(58) Field of Classification Search ................. 250/428, 250/432 R, 433, 434, 435, 432 PD, 492.1, 250/492.3; 600/1, 2, 3, 4; 210/748.01, 748.12
See application file for complete search history.

(56) References Cited

U.S. PATENT DOCUMENTS

| | | | | |
|---|---|---|---|---|
| 4,487,738 | A | 12/1984 | O'Brien, Jr. et al. | |
| 5,037,602 | A | 8/1991 | Dabiri et al. | |
| 6,157,036 | A | 12/2000 | Whiting et al. | |
| 6,475,644 | B1 | 11/2002 | Hampikian et al. | |
| 2005/0069076 | A1 * | 3/2005 | Bricault et al. | 376/190 |
| 2009/0032446 | A1 * | 2/2009 | Wiemers et al. | 210/85 |

FOREIGN PATENT DOCUMENTS

| | | | |
|---|---|---|---|
| WO | 97/07122 | | 2/1997 |
| WO | WO2006/114433 | * | 11/2006 |

* cited by examiner

*Primary Examiner*—Jack I Berman
*Assistant Examiner*—Nicole Ippolito Rausch
(74) *Attorney, Agent, or Firm*—Ladas & Parry LLP

(57) ABSTRACT

A procedure for the preparation of radioisotopes consisting of a first step of electrodepositing a metallic isotope target to be irradiated on a target-holder element, a second step of irradiating the target, a third step of dissolving the target and a fourth set of purifying the radioisotope from the initial metallic isotope and from other possible radioactive and metallic impurities; the electrodeposition step in turn consisting of a dissolution operation in which the isotope to be irradiated is dissolved in a solution of $HNO_3$ with concentration from 0.5 to 2.5 M, a pH buffering operation, and a recirculation operation, in which the solution obtained above is circulated at a rate from 0.5 to 3 within an electrolytic cell during the current output within the cell itself; the electrodeposition of the target to be irradiated occurs within the electrolytic cell during the recirculation operation.

8 Claims, No Drawings

PROCEDURE FOR THE PREPARATION OF RADIOISOTOPES

The present invention relates to a procedure for the preparation of radioisotopes.

BACKGROUND OF THE INVENTION

The production of radioisotopes by means of medium or low energy irradiation (5-30 MeV) for medical uses has been know for years. Radioisotopes find several and important industrial and scientific applications. The most important application is their use as tracers: radiopharmaceuticals, whose administration in humans may allow to diagnose and monitor a therapy by means of Positron Emission Tomography (PET), particularly for tumours, are synthesised by means of reactions with appropriate non-radioactive precursors. By measuring the irradiation, it is also possible to follow all the transformations of the element and/or the molecule it is bound to, which is useful in chemistry (study of reaction mechanisms), in biology (study of metabolism genetics) and, as mentioned above, in medicine for diagnostic and therapeutic uses.

The known systems provide that the target once arranged on the target-holder is placed in the irradiation station and that once the irradiation operation is ended, the target-holder is dissolved with the irradiated target and, subsequently, removed from the radioisotope produced by means of a purification process.

SUMMARY OF THE INVENTION

It is the object of the present invention to make a procedure for the preparation of radioisotopes capable of guaranteeing a more effective production of radioisotopes in terms of productivity with respect to the known art.

DETAILED DESCRIPTION OF THE INVENTION

The object of the present invention is a procedure for the preparation of radioisotopes comprising a first step of electrodepositing a metallic isotope target to be irradiated on a target-holder element, a second step of irradiating said target, a third step of dissolving said target and a fourth step of purifying the radioisotope from the initial metallic isotope and from other possible radioactive and metallic impurities; said procedure being characterised in that said electrodeposition step comprises a dissolution operation in which the isotope to be irradiated is dissolved in a solution of $HNO_3$ with concentration from 0.5 to 2.5 M, a pH buffering operation, and a recirculation operation, in which the solution obtained above is circulated at a rate from 0.5 to 3 ml/min within an electrolytic cell during the current output within the cell itself; said isotope target to be irradiated being produced by electrodeposition in said electrolytic cell during said recirculation operation.

Preferably, in the dissolution operation, the concentration of $HNO_3$ is from 2 to 2.5 M.

Preferably, in the recirculation operation, the solution is circulated at a rate from 1 to 2 ml/min.

Preferably, said pH adjustment operation is an alkalisation operation adapted to take the pH to a value from 5 to 13.5.

Preferably, the output current during the recirculation operation has an intensity from 40 to 100 mA and a difference of potential from 2 to 3 V.

Preferably, the electrodissolution step comprising a further recirculation operation in which a solution of HCl with concentration from 4 to 6M is circulated at a rate from 3 to 5 ml/min within the electrolytic cell during the output of reverse current with respect to that output during the electrodeposition step.

Preferably, the metallic isotope to be irradiated is comprised in the group consisting of $^{60}Ni$, $^{61}Ni$, $^{64}Ni$, $^{110}Cd$.

Preferably, the purification step comprises an elution operation in an ion-exchange column by means of a concentration gradient solution of HCl.

EXAMPLES

Below, some embodiments will be shown by way of illustrative and non-limiting example for a better understanding of the invention.

$^{60}Cu$ Preparation

—$^{60}Ni$ Electrodeposition—

100 mg of $^{60}Ni$ were dissolved in 1.7 ml of $HNO_3$ 2.3M solution. 2 ml of ammonium hydroxide/ammonium chloride, 0.8 ml of ammonium hydroxide and 5.5 ml of deionised water were added to this acid solution obtaining 10 ml of a $^{60}Ni$ solution with pH of 9.244.

The basic solution thus obtained was circulated at a rate of 1.5-2 ml/min through an electrolytic cell in which a 2.3 V current was output at an intensity from 50 to 70 mA. Such conditions were maintained for 7 h, with the result that a quantity of 50 mg of $^{60}Ni$ was electrodeposited.

—$^{60}Ni/^{60}Cu$ Electrodissolution—

After appropriately irradiating the 50 mg of electrodeposited $^{60}Ni$ for the production of $^{60}Cu$ isotope, a solution of HCl 6M was circulated at a rate of 5 ml/min within the electrolytic cell in which a reverse current with respect to that output within the electrodeposition step was output. In these conditions, a quantitative dissolution was obtained after a period of 2 minutes by applying a temperature of 90° C.

—$^{60}Cu$ Purification—

After dissolving the $^{60}Ni/^{60}Cu$ complex, the $^{60}Cu$ was purified from the $^{60}Ni$ by means of a ion-exchange column. The acid solution from the electrodissolution step was transferred to a Bio-Rad AG1-X8 column under helium flow. The $^{60}Ni$ was eluted with 15 ml of HCl 6 M solution and the $^{60}Cu$ was eluted with 10 ml of HCl 0.1M solution.

$^{110}In$ Preparation

—$^{110}Cd$ Electrodeposition—

100 mg of $^{110}Cd$ were dissolved in 0.114 ml of a $HNO_3$ solution at 69% v:v and 0.114 ml of deionised water at a temperature of 100° C. under vigorous stirring. 1.552 ml of deionised water were added to the solution thus obtained in order to obtain a final volume of 1.78 ml. 1.78 ml of an EDTA solution, 2 ml of a buffering solution of acetic acid/ammonium acetate at pH 4.76, a solution of NaOH at 50% v/v were added to such solution to reach pH 6.5 and deionised water to reach a volume of 10 ml.

The solution thus obtained was circulated at a rate of 1.5-2 ml/min through an electrolytic cell in which a current of 2.5-2.9 V was output at an intensity from 30 to 70 mA. Such conditions were maintained for a period of 6h, with the result that a quantity of 72 mg of $^{110}Cd$ was electrodeposited.

—$^{110}Cd/^{110}In$ Electrodissolution—

After appropriately irradiating the 72 mg of electrodeposited $^{110}Cd$ for the production of the $^{110}In$ isotope, a solution of HCl 4M was circulated at a rate of 5 ml/min within the electrolytic cell in which a reverse current with respect to that output during the electrodeposition step was output. A quantitative dissolution was obtained after a period of 1.5 minutes in these conditions.

Alternatively, dissolution was obtained without application of reverse voltage in a time from 3 to 5 minutes.

—$^{110}In$ Purification

After dissolving the $^{110}Cd/^{110}In$ complex, the $^{110}In$ was purified from the $^{110}Cd$ by means of a ion-exchange column. The acid solution from the electrodissolution step was transferred to a Bio-Rad AG1-X8 column under helium flow. The $^{110}Cd$ was eluted with 15 ml of a HCl 4 M solution and the $^{110}In$ was eluted with 10 ml of a HCl 0.05M solution.

$^{110}In$ Preparation (bis)

This new example shows an alternative method for the preparation of the $^{110}In$. Such alternative method differs from what stated above only in that a pH 13.4 buffering solution is used for the electrodeposition step. From the above, it is apparent that only the electrodeposition step will be reported for this specific example.

—$^{110}Cd$ Electrodeposition (bis)—

100 mg of $^{110}Cd$ were dissolved in 0.114 ml of a $HNO_3$ solution at 69% v:v and 0.114 ml of deionised water at a temperature of 100° C. under strong stirring. 1.552 ml of deionised water were added to the solution thus obtained in order to obtain a final volume of 1.78 ml. 1.78 ml of a solution of EDTA, 4 ml of a buffering solution of ammonium hydroxide/ammonium chloride, 0.8 ml of ammonium hydroxide, 5.5 ml of deionised water, 2.44 ml of a NaOH solution at 50% v/v were added to such solution to reach a pH of 13.4.

The solution thus obtained was circulated at a rate of 1.5-2 ml/min through an electrolytic cell in which a current of 2.5-2.9 V was output at an intensity from 30 to 70 mA. Such conditions were maintained for 6 h, with the result that a quantity of 72 mg of $^{110}Cd$ was electrodeposited.

The procedure according to the present invention presents the advantage of not requiring the simultaneous dissolution of the target holder with obvious advantages in terms of time and convenience that this entails, and moreover, allows to perform the electrodeposition step of the target relatively rapidly and in essentially mild current conditions. Finally, as apparent to a person skilled in the art, the procedure is perfectly fit to be implemented by means of an automated machine thus drastically reducing the total preparation time of the radioisotopes.

The invention claimed is:

1. A procedure for the preparation of radioisotopes comprising a first step of electrodepositing a metallic isotope target to be irradiated on a target-holder element, a second step of irradiating said target, a third step of dissolving said target and a fourth step of purifying the radioisotope from the initial metallic isotope and from other possible radioactive and metallic impurities; said procedure being characterised in that said electrodeposition step comprises a dissolution operation in which the isotope to be irradiated is dissolved in a solution of $HNO_3$ with concentration from 0.5 to 2.5 M, a pH buffering operation, and a recirculation operation, in which the solution obtained above is circulated at a rate of 0.5 to 3 ml/min within an electrolytic cell during the output of current within the cell itself; said isotope target to be irradiated being produced by electrodeposition in said electrolytic cell during said recirculation operation.

2. A procedure according to claim 1, characterised in that in the dissolution operation, the concentration of HNO3 is from to 2 to 2.5 M.

3. A procedure according to claim 1, characterised in that during the recirculation operation the solution is circulated at a rate from 1 to 2 ml/min.

4. A procedure according to claim 1, characterised in that said pH buffering operation is an alkalisation operation adapted to take the pH to a value from 5 to 13.5.

5. A procedure according to claim 1, characterised in that said current output during the recirculation operation has an intensity from 40 to 100 mA and a difference of potential from 2 to 3 V.

6. A procedure according to claim 1, characterised in that the electrodissolution step comprising a further recirculation operation in which a solution of HCl with concentration from 4 to 6 is circulated at a rate from 3 to 5 ml/min within the electrolytic cell during the output of current reversed with respect to that output during the electrodeposition step.

7. A procedure according to claim 1, characterised in that the metallic isotope to be irradiated is comprised in the group consisting of $^{60}Ni$, $^{61}Ni$, $^{64}Ni$, $^{110}Cd$.

8. A procedure according to claim 1, characterised in that the purification step comprises an operation of elution in an ion-exchange column by means of a concentration gradient HCl solution.

* * * * *